R. D. SIMPSON.
WAREHOUSE TRUCK.
APPLICATION FILED MAY 17, 1919. RENEWED APR. 3, 1922.

1,432,267.

Patented Oct. 17, 1922.
2 SHEETS—SHEET 1.

WITNESSES:
Harry C Dean.

INVENTOR.
Robert D Simpson
BY
Dudley T Fisher
ATTORNEY.

R. D. SIMPSON.
WAREHOUSE TRUCK.
APPLICATION FILED MAY 17, 1919. RENEWED APR. 3, 1922.
1,432,267.
Patented Oct. 17, 1922.
2 SHEETS—SHEET 2.
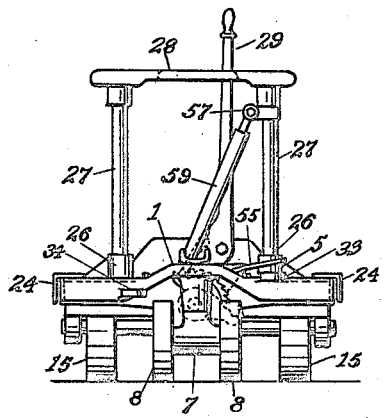
Fig. 4.
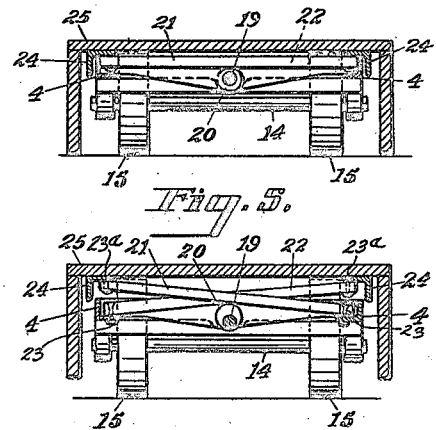
Fig. 5.
Fig. 6.
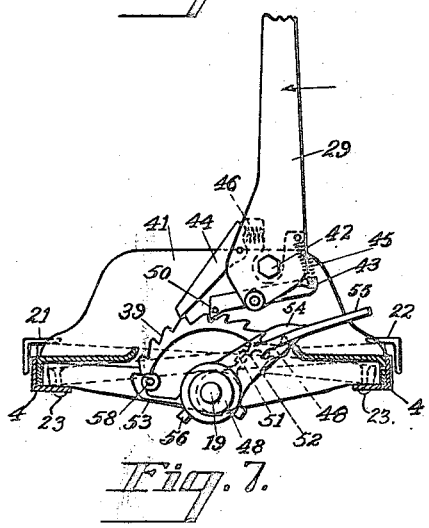
Fig. 7.
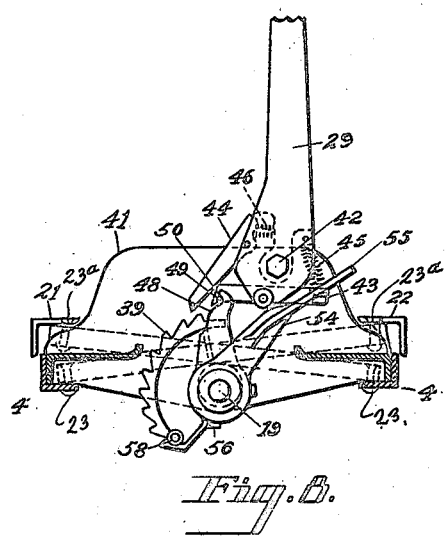
Fig. 8.
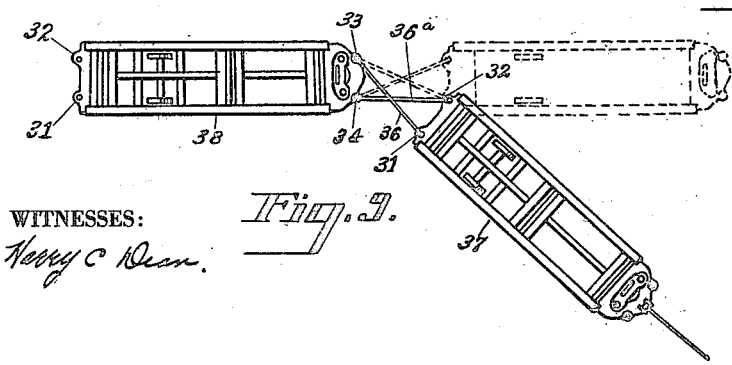
Fig. 9.
WITNESSES:
Harry C Dean
INVENTOR.
Robert D Simpson
BY
Dudley T Fisher
ATTORNEY.

Patented Oct. 17, 1922.

1,432,267

UNITED STATES PATENT OFFICE.

ROBERT D. SIMPSON, OF COLUMBUS, OHIO, ASSIGNOR TO FREDRICK H. ANGELL, OF COLUMBUS, OHIO; S. ALICE ANGELL EXECUTRIX OF SAID FREDRICK H. ANGELL, DECEASED.

WAREHOUSE TRUCK.

Application filed May 17, 1919, Serial No. 297,784.   Renewed April 3, 1922.   Serial No. 549,220.

*To all whom it may concern:*

Be it known that I, ROBERT D. SIMPSON, a citizen of the United States, residing at Columbus, in the county of Franklin and State of Ohio, have invented certain new and useful Improvements in Warehouse Trucks, of which the following is a specification, reference being had therein to the accompanying drawing.

The present invention relates to certain new and useful improvements in ware house trucks, and especially to that class of trucks which is adapted to be inserted beneath a previously arranged load, lift it clear of the floor and transport it to the desired place where it may be again set down and the truck removed.

It is a common practice in commercial establishments to provide a plurality of removable platforms upon which goods may be piled, which are adapted to be used in conjunction with a single truck for the transportation of said goods from place to place. Such platforms are arranged to admit of the insertion of the truck therebeneath, and to be lifted clear of the floor by devices upon the truck.

It is the especial object of this invention to provide in a truck of the class described, improved lifting devices by which the operator may conveniently lift the platform with its superimposed load, clear of the floor, such lifting devices being adapted to automatically hold the load in any position of either complete or partial elevation.

A further object is to provide conveniently operated devices whereby the load holding devices may be released to permit the lowering of the platform.

These and other objects will appear in the following specification, reference being had to the accompanying drawings in which Fig. 1 is a general plan view of the preferred embodiment of my invention.

Fig. 4 is a front elevation of the device illustrated in Figs. 1 and 2.

Fig. 5 is a cross sectional view taken along the line V—V of Fig. 1, showing the associated platform in the lowered position.

Fig. 6 is a view similar to Fig. 5 showing the associated platform in elevated position.

Fig. 7 is a fragmentary sectional view taken along the line VII—VII of Fig. 1, showing the operating mechanism in the lowered position.

Fig. 8 is a view similar to Fig. 7, showing the operating mechanism in the elevated position.

Fig. 9 is a diagrammatic figure showing two trucks coupled together in a train, and illustrating the method of steering one truck by the manipulation of the propelling truck.

Like numerals refer to similar parts in the several figures.

Figure 1:
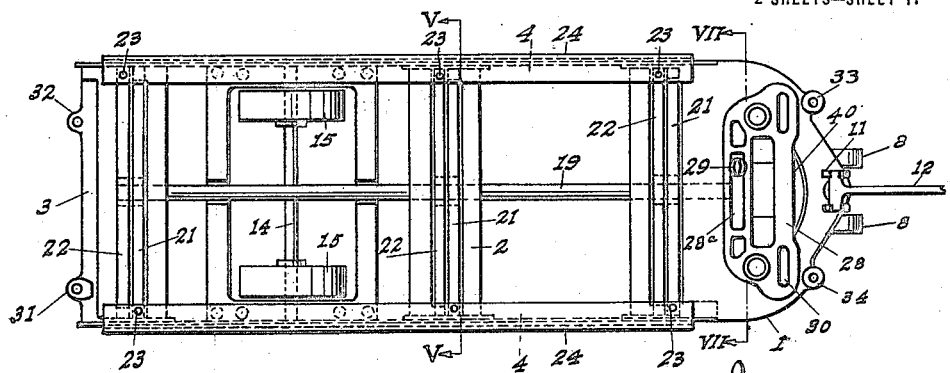
Figure 2:
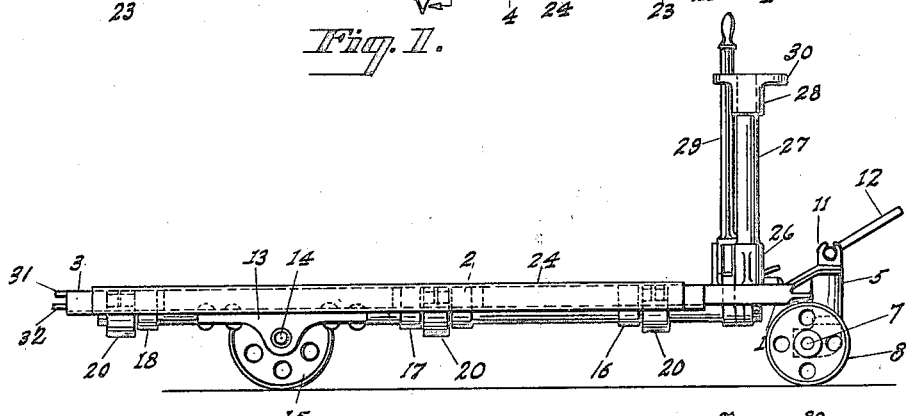
Fig. 2 is a side elevation of the device illustrated in Fig. 1.
Figure 3:
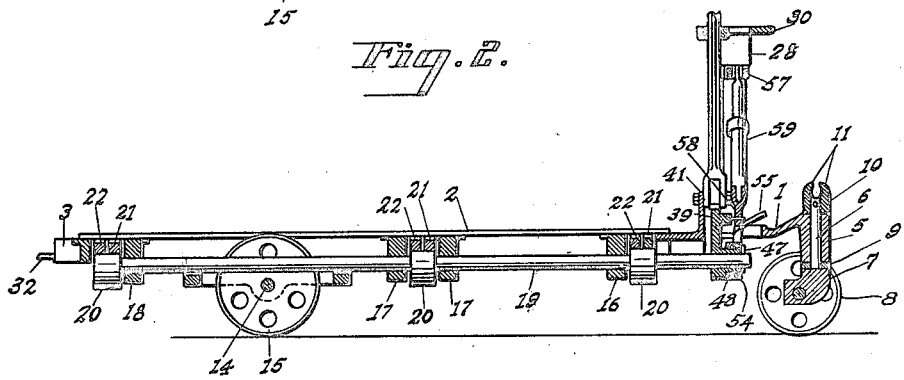
Fig. 3 is a section taken along the central longitudinal vertical plane of the truck.
Figure 10:
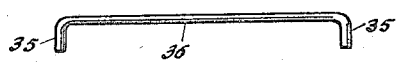
Fig. 10 is a detail of the coupling bar by which the trucks may be connected together.

As illustrated in the drawings my improved truck comprises a main frame composed of an end cross frame casting 1, an intermediate cross member 2 and a rear end cross member 3, preferably formed of steel or iron castings, and joined together by the longitudinally extending side rails 4, formed of steel angle bars. The front end frame 1 is extended forwardly and is formed integral with the vertically extending journal bearing 5 positioned on the longitudinal center line of the truck. Journaled in the bearing 5 is a pivot shaft 6 to the lower end of which is secured the front axle 7. The axle 7 is provided with wheels 8 adapted to travel over the floor of the ware house. A bearing washer 9 interposed between the axle 7 and the lower end of the journal bearing 5 supports the weight of the truck and facilitates the rotation of the axle about the axis of the pivot shaft. A collar 10 attached to the upper end of the shaft 6 prevents the accidental removal of the pivot shaft from its journal bearing in case the truck is lifted from the floor. Upon the collar 10 are formed upstanding prongs 11 which serve for the attachment of a suitable removable tongue, or handle, 12 by which the truck may be guided about the floor. Attached to the side rails 4 near the rear end of the truck are the journal bearings 13 in which is journaled the rear axle 14 having truck supporting wheels 15 adapted to travel over the floor of the ware house.

Formed in the cross members 1, 2 and 3 are journal bearings 16, 17 and 18 positioned in the central longitudinal vertical plane of the truck. Journaled in these bearings is a shaft 19 adapted to be rotated by manually operated devices which will be hereinafter described. Fixed to the shaft 19 are a plurality of eccentric cams 20 so arranged that the points of maximum eccentricity of all the cams are in the same radial plane relative to the shaft 19. The cross members 1, 2 and 3 are shaped to form pockets in which are seated one end of each of the pairs of lifting fingers 21 and 22 which are disposed transversely of the truck and bear upon the lifting cams 20. Rivets 23 secured in the side rails 4 and extending loosely through suitable apertures in the lifting fingers 21 and 22, serve to retain said fingers in place without materially restricting their desired freedom of movement. The parts above described are so disposed that when the shaft 19 is rotated to cause the cams 20 to extend downwardly the fingers 21 and 22 will lie parallel with each other in substantially horizontal position, and when said shaft is rotated to cause said cams to extend upwardly said fingers will be oppositely inclined, their free ends being elevated above the truck frame, as shown in Fig. 6. Longitudinally extending angle bars 24 attached by suitable rivets 23ª to the free ends of the lifting fingers 21 and 22 are arranged to engage the under side of the platform 25 to lift said platform, with its superimposed load, free of the floor of the ware house in the manner to be more fully hereinafter described.

Formed on the front frame casting 1 are two upstanding sockets 26 in which are fixed the columns 27. To the upper ends of the columns 27 is attached the cap casting 28 which serves the double purpose of guiding and guarding the hoisting lever 29, and of forming handles 30 which afford the preferred means of pushing or pulling the truck about the floor. The wheels 8 being symmetrically arranged about the pivot shaft 6, and being freely rotatable thereabout, form a self directing caster which lends itself readily to that mode of propulsion.

Formed of the metal of the cross members 1 and 3 near the corners of the truck, are lugs 31, 32, 33 and 34, each of which is provided with an aperture adapted to be engaged by the hooks 35 at the ends of the coupling bars 36 and 36ª. The lugs 31 and 33 at the rearward right hand and the forward left hand corners respectively are positioned in the same horizontal plane, while the lugs 32 and 34 at the rearward left hand and forward right hand corners respectively are positioned in a lower horizontal plane, the said horizontal planes being offset a distance approximately equal to the thickness of the coupling bar 36. To couple two truck units together a bar 36 is placed in engagement with the lug 31 of the front truck 37 and the lug 33 of the rear truck 38, and a second bar 36ª is placed in engagement with the lug 32 of the front truck 37 and the lug 34 of the rear truck 38, as illustrated in Fig. 9. By the horizontal offsetting of the lugs as above described the bars 36 and 36ª will move freely over each other as the trucks are guided around a curve. By this arrangement of coupling bars the truck 37 will respond to lateral movements of the truck 38, and will be guided thereby while moving either forward or backward with equal facility. Several trucks may in this manner be coupled together, and may be either pushed or pulled, the entire train being steered by the manipulation of the propelling truck.

Rigidly mounted upon the shaft 19 at its forward end, is a ratchet segment 39 positioned in the aperture 40 of the frame casting 1 adjacent the upstanding flange 41. Fixed to the flange 41 is a stud bolt 42 upon which the hoisting lever 29 is journaled. The hoisting lever 29 extends upwardly through a slot 28ª in the cap casting 28 by which its movements are limited. Pivotally mounted near the lower end of the lever 29 are two pawls 43 and 44 adapted to be pressed by the springs 45 and 46 into engagement with the teeth of the ratchet 39. The pawls 43 and 44 are so disposed relative to the stud bolt 42 that one or other of them will engage the ratchet 39 with each movement in either direction of the lever 29 to cause rotation of the shaft 19 in the lifting direction.

The hub 47 of the ratchet 39 extends forwardly, and upon this extension is rotatively mounted an arm 48 having a notch 49 adapted to engage the pin 50 secured to the pawl 43 to lift it out of engagement with the ratchet. The parts are so proportioned that the pawl 43 will engage the pawl 44, and will also lift it free of the ratchet, leaving the shaft 19 free to rotate in the lowering direction. Formed on the rearward side of the arm 48 is a lug 51 adapted to engage the radial flanges 52 and 53 of the ratchet segment 39. As the ratchet 39 moves in the lifting direction the flange 52 engages the lug 51 to cause the movement of the arm 48 and its engagement with the pawl 43, releasing the ratchet 39 just as the cams 20 pass the position of maximum elevation. As the ratchet 39 moves in the lowering direction the flange 53 will engage the lug 51 to release the pawls 43 and 44 as the cams approach the position of minimum elevation and permit the shaft to be again rotated in the lifting direction.

Journaled upon the hub 47 of the ratchet segment, adjacent the arm 48, is a second arm 54 which is expanded laterally to form the pedal 55. Formed on the edge of the arm 54 is a lug 56 adapted to engage the flange 53 of the ratchet segment when the lifting cams 20 are in positions of relatively great elevation. At such times the direction of the pressure of the lifting fingers 21 and 22 upon the cams 20 is so nearly in the vertical plane of their centers of rotation that there is small tendency for the weight of the load to produce rotation of the shaft 19 in the lowering direction. By pressing his foot upon the pedal 55 the operator can produce such rotation and the desired lowering of the load.

Pivotally connected to the lug 57 of the cap casting 28, and to the stud 58 of the ratchet segment, is a dash pot 59 arranged to retard the rotation of the shaft 19 in the lowering direction, thereby preventing the too sudden dropping of the load. As such dash pots are well understood by those skilled in the art, and as their construction forms no part of the present invention, further description at this time is not thought to be required.

In practice a plurality of platforms 25 are commonly provided for use with each truck, and these are placed in convenient proximity to the material which is to be transported. After the material has been arranged upon the platform the truck is inserted beneath it and the lever 29 manipulated to cause the rotation of the shaft 19 and the lifting of the platform clear of the floor. Should the operator inadvertently loose his hold upon the lever 29 before the load has been raised to the traveling position, the pressure of the ratchet teeth upon the pawl 43 or 44 will cause the movement of the lever 29 to one end or the other of the slot 28$^a$ by which its further movement will be prevented and the load will be retained in that position. In order to lower the load it is necessary to rotate the shaft 19 to the position of maximum load elevation to cause the arm 48 to engage the pawls 43 and 44 and permit the rotation of the shaft in the load lowering direction. When the pawls are thus placed out of engagement with the ratchet the operator, by stepping on the pedal 55 causes the shaft to make such revolution thereby lowering the load, the dash pot 59 acting to insure the material upon the truck against shock resulting from too rapid lowering.

What I claim is—

1. In a truck of the class described, the combination with a wheel supported frame, of a horizontal shaft journaled in said frame, load engaging elements adapted to be moved vertically by rotation of the shaft, a ratchet fixed to the shaft, a lever mounted for limited rotary movement about a pivot adjacent the ratchet, ratchet engaging pawls connected with the lever and so arranged that movement of the lever in either direction will cause rotation of the shaft in a direction to move the load engaging elements upward, and means actuated by said lever to disengage said pawls from said ratchet.

2. In a truck of the class described, the combination with a wheel supported frame, of a horizontal shaft journaled in said frame, load engaging elements adapted to be moved vertically by rotation of the shaft, a ratchet fixed to the shaft, a lever mounted for limited rotary movement about a pivot adjacent the ratchet, ratchet engaging pawls connected with the lever and so arranged that movement of the lever in either direction will cause rotation of the shaft in a direction to move the load engaging elements upward, and automatically acting means to disengage the pawls from the ratchet to permit rotation of the shaft in the opposite direction.

3. In a truck of the class described, the combination with a wheel supported frame, a horizontal shaft journaled in said frame, load engaging elements adapted to be moved vertically by rotation of the shaft, a ratchet fixed to the shaft, a lever mounted for limited rotary movement about a pivot adjacent the ratchet, ratchet engaging pawls connected with the lever and so arranged that movement of the lever in either direction will cause rotation of the shaft in a direction to move the load engaging elements upward, and automatically acting means operable when the load engaging elements reach a predetermined elevation to disengage the pawls from the ratchet and permit rotation of the shaft in the opposite direction.

4. In a truck of the class described, the combination with a wheel supported frame, of a horizontal shaft journaled in said frame, load engaging elements adapted to be moved vertically by rotation of the shaft, a ratchet fixed to the shaft, a lever mounted for limited rotary movement about a pivot adjacent the ratchet, ratchet engaging pawls connected with the lever and so arranged that movement of the lever in either direction will cause rotation of the shaft in a direction to move the load engaging elements upward, automatically acting means to disengage the pawls from the ratchet, and means to rotate the shaft in the opposite direction.

5. In a truck of the class described, the combination with a wheel supported frame, of a horizontal shaft journaled in said frame, load engaging elements adapted to be moved vertically by rotation of the shaft, a ratchet fixed to the shaft, a lever mounted for oscillation adjacent the shaft, a ratchet engaging pawl connected with said lever to cause rotation of said shaft in a direction to move the load engaging elements upward, and means actuated by the rotation of the shaft to disengage said pawl from said ratchet when the load engaging element reaches a predetermined elevation.

6. In a truck of the class described, the combination with a wheel supported frame, of a horizontal shaft journaled in said frame, a load engaging element adapted to be moved vertically by the rotation of the shaft, a ratchet fixed to the shaft, a lever mounted for oscillation adjacent the shaft, a ratchet engaging pawl connected with the lever to cause rotation of the shaft in a direction to move the load engaging element upward, and an arm rotatable about the shaft and adapted to engage said pawl to release said ratchet when the load engaging element reaches a predetermined elevation.

7. In a truck of the class described, the combination with a wheel supported frame, of a horizontal shaft journaled in the frame, a load engaging element adapted to be moved vertically by the rotation of the shaft, a ratchet fixed to the shaft, a lever actuated ratchet engaging pawl adapted to produce rotation of the shaft in a direction to move the load engaging element upward, and devices actuated by movement of the lever to release said ratchet and permit rotation of the shaft in the opposite direction.

8. In a truck of the class described, the combination with a wheel supported frame, of a horizontal shaft journaled in the frame, a load engaging element adapted to be moved vertically by rotation of the shaft, a ratchet fixed to the shaft, a lever adapted to produce rotation of the shaft, a pawl adapted to engage said ratchet to prevent rotation of the shaft in a direction to move the load engaging element downward, and devices actuated by movement of the lever to disengage said pawl from said ratchet.

In testimony whereof, I affix my signature.

ROBERT D. SIMPSON.